United States Patent Office
3,832,203
Patented Aug. 27, 1974

3,832,203
WATER REPELLENT PROCESS AND
COMPOSITION
Frederick Charles Saunders, Midland, Mich., and Charles Smith, Glamorgan, Wales, assignors to Dow Corning Limited, Berkshire, England
No Drawing. Filed Jan. 21, 1972, Ser. No. 219,902
Claims priority, application Great Britain, Feb. 3, 1971, 3,834/71
Int. Cl. C08g 47/02; C14c 9/00
U.S. Cl. 106—287 SB          5 Claims

ABSTRACT OF THE DISCLOSURE

A composition for treating leather to impart durable water repellency thereto. The composition comprises a solvent solution of (1)(a) from 15 to 50 percent by weight of $Ti(OR)_4$ or $Zr(OR)_4$ or partial hydrolysate thereof in which R is an aliphatic hydrocarbon or hydroxylated hydrocarbon radical, (b) 5 to 70 percent by weight of a copolymer of trimethylsiloxane and $SiO_2$ units (c) 15 to 80 percent of a polysiloxane of average unit formula $$R'_m SiO_{\frac{4-m}{2}}$$

in which R' alkyl, alkenyl or aryl and m is 2 to 2.9 and (2) from 0.5 to 30 percent by weight of an aminoalkyl substituted silane or siloxane.

---

This invention relates to a method for treating leather to improve the water repellent properties thereof.

It is known that leather may be rendered water repellent by treatment with compositions containing organopolysiloxanes. Such a process has however, not received very wide commercial acceptance, a drawback of such treatment being the limited durability of the water repellent effect obtained. It is also known from U.K. Patent Specification No. 1,005,475 that leather may be treated by applying as the fat liquoring agent a water-soluble copolymer or copolymer salt of a specified silane containing silicon-bonded aminoalkyl radicals and alkoxy radicals. Treatment of the leather in this manner is stated to render the leather supple and water repellent. According to the said U.K. Specification the fat liquored leather may be subject to a post treatment involving the application of a specified three component siloxane composition. The aminosilane reaction product is preferably used at a level of at least three percent of the weight of the leather. Thus, whilst the process of Pat. No. 1,005,475 can provide leather having enhanced water repellency this is attained only at a relatively high cost.

We have now found that leather having water repellency of improved durability may be obtained if there is applied to the leather, after fat liquoring, a composition containing an amount of an amino silane or an amino siloxane which may be considerably less than required according to the process of U.K. Pat. No. 1,005,475.

Accordingly, this invention provides a composition for application to leather the said composition comprising an organic solvent solution of (1)(a) from 15 to 50 percent by weight of a titanium compound of the general formula $Ti(OR)_4$, or a zirconium compound of the general formula $Zr(OR)_4$ or an aliphatic hydrocarbon-soluble partial hydrolysate of such a titanium or zirconium compound, in which compound R is an aliphatic hydrocarbon radical containing less than 13 carbon atoms or a hydroxylated aliphatic hydrocarbon radical containing less than 13 carbon atoms and less than 4 hydroxy radicals; (b) 5 to 70 percent by weight of a methylpolysiloxane composed essentially of trimethylsiloxane units and $SiO_2$ units, said units being in such proportions that the ratio of methyl radicals to Si atoms is from 0.8:1 to 2.0:1; (c) 15 to 80 percent by weight of a polysiloxane having the average unit formula $$R'_m SiO_{\frac{4-m}{2}}$$

where R' is an alkyl or alkenyl radical containing less than 6 carbon atoms or a monocyclic aryl radical, and m has an average value of from 2 to 2.9; and (2) from 0.5 to 30 percent, preferably 5 to 15 percent, by weight based on the weight of (1) of a silane of the general formula $$X_2NYSi(OZ)_{3-a}R''_a$$
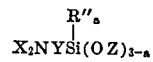

and/or an organosiloxane of the average unit formula $$R'''SiO_{\frac{4-m}{2}}$$
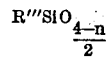

wherein each X represents a hydrogen atom, a monovalent hydrocarbon radical having less than 19 carbon atoms or an amine-substituted monovalent hydrocarbon radical, Y represents a divalent hydrocarbon radical having from 3 to 6 carbon atoms, the nitrogen atom of the $NX_2$ radicals being at least 3 carbon atoms removed from the silicon atom, R'' and Z each represent an alkyl radical having from 1 to 4 carbon atoms, a is 0, 1 or 2, n has an average value of from 1.9 to 2.1 and R''' represents an alkyl radical having up to 5 carbon atoms or a $-YNX_2$ radical, from 0.5 to 15 percent of the total R''' radicals being $-YNX_2$ radicals.

The invention also includes a process for the treatment of leather which comprises applying to the leather after fat liquoring a composition according to the invention.

Compositions of the type (1) are fully described in British Pat. Nos. 736,378 and 773,347. For the purpose of the present invention component (a) of the composition is preferably a titanium compound, for example tetraisopropyl titanate, tetra-n-butyl titanate, tetra-2-ethylhexyl titanate and tetra-nonyl titanate. Component (c) of composition (1) is preferably a dimethylpolysiloxane having a viscosity within the range from 200 to 20,000 cs. at 25° C. The diorganopolysiloxane (c) may or may not be end-stopped with triorganosiloxy units, e.g. trimethylsiloxy, diphenylmethylsiloxy or dimethylvinylsiloxy units.

Component (2) of the compositions of this invention is preferably a silane of the general formula $$X_2NYSi(OZ)_{3-a}R''_a$$
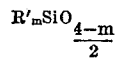

wherein X, Y, R'', Z and a are as defined above. It may, however, also be an organosiloxane of the average unit formula $$R'''SiO_{\frac{4-n}{2}}$$
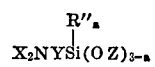

in which R''' is as above defined. In the organosiloxane from 0.5 to 15 percent of the total R''' radicals should be radicals of the formula $-YNX_2$. The remaining R''' radicals are alkyl radicals having up to and including 5 carbon atoms, methyl radicals being most preferred. Below 0.5 percent of $-YNX_2$ radicals the increase in durability of water repellency is not significant. No advantage is thought to accrue from the presence of more than 15 percent of the said groups. The preferred organosiloxanes are those having from one to five percent of the specified $-YNX_2$ radicals.

In the general formulas the Y radicals may be for example $-(CH_2)_3-$, $-(CH_2)_4-$, $-CH_2CHCH_3CH_2-$ and $-(CH_2)_6-$. The X radicals may be for example methyl, ethyl, propyl, decyl, octadecyl, vinyl, phenyl, benzyl, —$CH_2CH_2NH_2$ or —$CH_2CH_2NHCH_3$. The —$YNX_2$ radicals may therefore be for example,

—$(CH_2)_3NH_2$,

—$(CH_2)_4NHCH_3$, —$CH_2CHCH_3CH_2N(C_2H_5)_2$,

—$(CH_2)_3NHCH_2CH_2NH_2$,

—$CH_2CHCH_3CH_2NHCH_2CH_2NHC_6H_5$ or

—$(CH_2)_6NH(C_{10}H_{21})$.

Preferred as the operative organosiloxanes (2) are the copolymers comprising dialkylsiloxane units and $A_2SiO$ units wherein one A represents an alkyl radical having up to 5 carbon atoms and the other A represents the specified amino radical —$YNX_2$. Examples of the preferred organopolysiloxanes (2) therefore are copolymers of dimethylsiloxane units with delta - aminobutyl(methyl)siloxane units and/or gamma-aminopropyl(methyl)siloxane units and copolymers of dimethylsiloxane units with methyl (N-beta-aminoethyl-gamma-amino - n - propyl) siloxane units and/or methyl(N-beta-aminoethyl-gamma-aminoisobutyl)siloxane units. If desired the copolymers may be end-stopped with suitable chain terminating units for example triorganosiloxy units such as trimethylsiloxy units, diphenylmethylsiloxy units and dimethylvinylsiloxy units. Also if desired the specified amino-substituted radicals may be present in the terminal positions in the polymer chain, for example in a unit such as the dimethyl-(gamma-aminopropyl)siloxy unit.

The organosiloxanes may vary in consistency from low molecular weight freely flowing liquids to high molecular weight gums.

The preferred silanes are those in which Z is a methyl or ethyl radical, R″, when present, is methyl, and $a$ is 0 or 1. Examples of the preferred silanes therefore are (N-beta - aminoethyl - gamma - aminopropyl)triethoxysilane, methyl(N-beta-aminoethyl-gamma-aminoisobutyl) dimethoxysilane and aminopropyltriethoxysilane.

The compositions of this invention may be prepared by mixing the ingredients in any suitable manner. The composition obtained by mixing (1) and (2) has limted storage stability and (1) and (2) are preferably not mixed until required for use. Most conveniently therefore ingredients (a), (b) and (c) are dissolved in an organic solvent and ingredient (2) or a solvent solution thereof is added to the solution just prior to use.

In common with known methods for applying silicone compositions to leather the organic solvent employed should be sufficiently volatile to permit drying of the applied treatment at temperature below about 100° C. Suitable organic solvents include hydrocarbons and halogenated hydrocarbons, for example toluene, xylene, white spirit and perchloroethylene. The proportion of organic solvent present in the applied composition may be varied depending on the desired level of active ingredients (1) and (2) in the treated leather. For most purposes it is preferred to treat the leather with a composition containing a total of from 2 to 15 percent by weight of ingredients (1) and (2).

Leather may be treated according to the process of this invention after fat-liquoring, for example during the finishing process of the leather, or as the finished or semi-finished article, e.g. a shoe upper or made up garment, handbag or other article. Any suitable method of application may be employed for example immersion, brushing, spraying or curtain coating.

After treatment with the compositions of this invention the leather may be allowed to dry at normal ambient temperature or drying may be accelerated by exposure to elevated temperatures, for example up to about 100° C.

The following examples, in which the parts are expressed by weight, illustrate the invention.

EXAMPLE 1

A solution was prepared by dissolving in 55 parts of white spirit 17 parts of tetranonyl titanate, 17 parts of a trimethyl-siloxy end-stopped polydimethylsiloxane having a viscosity of approximately 300 cs. at 25° C. and 17 parts of a resin copolymer of $(CH_3)_3SiO$ units and $SiO_2$ units having a ratio of methyl radicals to silicon atoms of about 1.5:1. To 95 parts of this solution was added with stirring 400 parts of white spirit and 5 parts of a trimethylsiloxy end-stopped copolymer of 95 mol percent dimethylsiloxane units and 5 mol percent of methyl(betaaminoethyl-gamma - aminoisobutyl)siloxane units, the copolymer having a viscosity of approximately 3000 cs. at 25° C.

The solution thus obtained was applied to samples of full-chrome grain shoe leather by brushing at a level to provide a pick-up of 6–7 percent by weight of active ingredients based on the weight of leather.

For comparison, samples of the same leather were similarly treated except that the amino-siloxane copolymer was omitted from the treating solution.

The samples of treated leather were allowed to dry by exposure to the atmosphere at normal ambient temperature (about 22° C.) for 7 days and then tested for water repellency using the Maeser tester.

The following results were obtained:

|  | No amino-siloxane | With amino-siloxane |
|---|---|---|
| No. of flexes before water penetration | 7,000 | 9,000 |
| Percent absorption after 20,000 flexes | 23 | 11 |

EXAMPLE 2

Samples of a combination tanned leather, with a glazed finish were treated according to the method of Example 1 except that the aminosiloxane was replaced by the same amount of an aminoalkylsilane of the formula:

$(MeO)_2MeSi$—$CH_2CH_2CH_2NH$
$\phantom{(MeO)_2MeSi—CH_2CH_2CH_2NH}CH_2CH_2NH_2$  (Me=methyl)

For comparison, samples of the leather were also similarly treated with the solution from which the silane had been omitted.

The samples were tested according to the methods described in Journal of the Society of Leather Trades Chemists, 1960, 44, 374 the amplitude of flexing used being 10%. The following results indicate the durability of water repellency conferred by the aminoalkyl silane:

|  | No amino-silane | With amino-silane |
|---|---|---|
| Minutes to penetration | 5 | 15 |
| Percent absorption after one hour | 20.1 | 9.2 |
| Water transmitted in one hour after preparation | 3,140 | 201 |

This which is claimed is:

1. A composition consisting essentially of an organic solvent solution of (1)(a) from 15 to 50 percent by weight of a titanium compound of the general formula $Ti(Or)_4$, or a zirconium compound of the general formula $Zr(Or)_4$ or an aliphatic hydrocarbon-soluble partial hydrolysate of such a titanium or zirconium compound, in in which compound R is an aliphatic hydrocarbon radical containing less than 13 carbon atoms or a hydroxylated aliphatic hydrocarbon radical containing less than 13 carbon atoms and less than 4 hydroxy radicals, (b) 5 to 70 percent by weight of a methylpolysiloxane composed essentially of trimethylsiloxane units and $SiO_2$ units, said units being in such proportions that the ratio of methyl radicals to Si atoms is from 0.8:1 to 2.0:1, (c) 15 to 80 percent by weight of a polysiloxane having the average unit formula $$R'_m SiO_{\frac{4-m}{2}}$$

where R' is an alkyl or alkenyl radical containing less than 6 carbon atoms or a monocyclic aryl radical, and $m$ has an average value of from 2 to 2.9, and
(2) from 0.5 to 30 percent by weight based on the weight of (1) of a silane of the general formula $$X_2NYSi(OZ)_{3-a}$$
$$|$$
$$R''_a$$

and/or an organosiloxane of the average unit formula $$R'''SiO_{\frac{4-n}{2}}$$

wherein each X represents a hydrogen atom, a monovalent hydrocarbon radical having less than 19 carbon atoms or an amine-substituted monovalent hydrocarbon radical, Y represents a divalent hydrocarbon radical having from 3 to 6 carbon atoms, the nitrogen atom of the $NX_2$ radicals being at least 3 carbon atoms removed from the silicon atom, R'' and Z each represent an alkyl radical having from 1 to 4 carbon atoms, $a$ is 0, 1 or 2, $n$ has an average value of from 1.9 to 2.1 and R''' represents an alkyl radical having up to 5 carbon atoms or a $-YNX_2$ radical, from 0.5 to 15 percent of the total R''' radicals being $-YNX_2$ radicals, the ingredients (1) and (2) constituting a total of from 2 to 15 percent by weight of the solution and the organic solvent being sufficiently volatile to permit drying of the composition at a temperature below 100° C., when the composition is applied to leather.

2. A composition as claimed in claim 1 wherein the silane and/or siloxane (2) is employed in a proportion of from 5 to 15 percent by weight based on the weight of (1).

3. A composition as claimed in claim 2 wherein component (1)(c) is a dimethylpolysiloxane having a viscosity within the range from 200 to 20,000 cs. at 25° C.

4. A composition as claimed in claim 1 wherein component (2) is a silane of the general formula $$X_2NYSi(OZ)_{3-a}$$
$$|$$
$$R''_a$$

wherein X and Y are as defined in claim 1, Z represents the methyl or ethyl radical, $a$ is 0 or 1 and R'', when present, represents a methyl radical.

5. A process for the treatment of leather which comprises applying to the leather after fat liquoring a composition as claimed in claim 1 and thereafter drying the treated leather.

References Cited

UNITED STATES PATENTS

| | | | |
|---|---|---|---|
| Re. 23,879 | 9/1954 | Currie | 260—29.1 SB |
| 2,728,736 | 12/1955 | Hunter et al. | 106—287 SB |
| 3,294,566 | 12/1966 | Cooper | 106—287 SB |

FOREIGN PATENTS

| | | | |
|---|---|---|---|
| 1,005,475 | 9/1965 | Great Britain | 106—287 SB |

ALLAN LIEBERMAN, Primary Examiner

U.S. Cl. X.R.

117—142; 260—33.6 SB